(12) United States Patent
Williams

(10) Patent No.: US 7,399,162 B2
(45) Date of Patent: Jul. 15, 2008

(54) WIND TURBINE

(76) Inventor: Herbert L. Williams, 109 Rivers Edge Dr., East Palatka, FL (US) 32131

( * ) Notice: Subject to any disclaimer, the term of this patent is extended or adjusted under 35 U.S.C. 154(b) by 286 days.

(21) Appl. No.: 11/333,488

(22) Filed: Jan. 17, 2006

(65) Prior Publication Data
US 2007/0166159 A1 Jul. 19, 2007

(51) Int. Cl.
F01D 5/14 (2006.01)
(52) U.S. Cl. ............. 416/189; 416/224; 416/230; 416/233
(58) Field of Classification Search ......... 416/189, 416/197 A, 224, 230, 232, 233; 415/4.2, 415/4.4
See application file for complete search history.

(56) References Cited

U.S. PATENT DOCUMENTS

| 243,169 | A | * | 6/1881 | Sprague ............... 416/132 R |
| 2,855,179 | A | * | 10/1958 | Brown ................. 416/189 |
| 4,204,796 | A | * | 5/1980 | Pack, Jr. ............... 415/4.4 |
| 4,220,870 | A | | 9/1980 | Kelly |
| 4,276,033 | A | * | 6/1981 | Krovina .............. 440/8 |
| 4,319,865 | A | * | 3/1982 | Richard .............. 416/41 |
| 4,330,714 | A | | 5/1982 | Smith |
| 4,350,895 | A | | 9/1982 | Cook |
| 4,545,729 | A | | 10/1985 | Storm |
| 4,729,716 | A | | 3/1988 | Schmidt |
| 5,315,159 | A | | 5/1994 | Gribnau |
| 5,436,508 | A | | 7/1995 | Sorensen |
| 6,664,655 | B2 | | 12/2003 | Vann |

* cited by examiner

Primary Examiner—Edward Look
Assistant Examiner—Devin Hanan
(74) Attorney, Agent, or Firm—Thomas C. Saitta

(57) ABSTRACT

A fluid turbine, such as a wind or hydro turbine, for generating electrical power, the turbine having a rotor assembly comprising a hub, a rim and a plurality of tensioned cable members joining them together, the cable members being grouped into sets to define a plurality of supports for individual skin members to create a plurality of lightweight blade members.

20 Claims, 6 Drawing Sheets

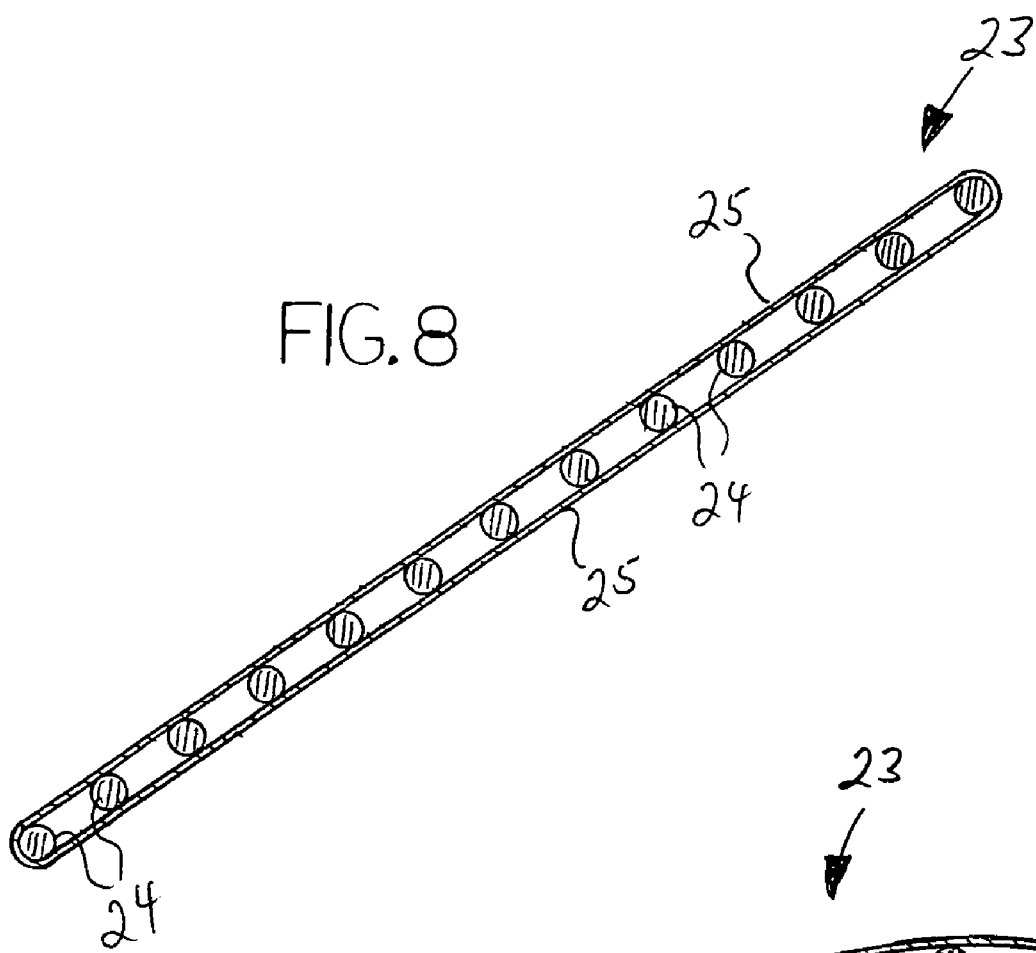
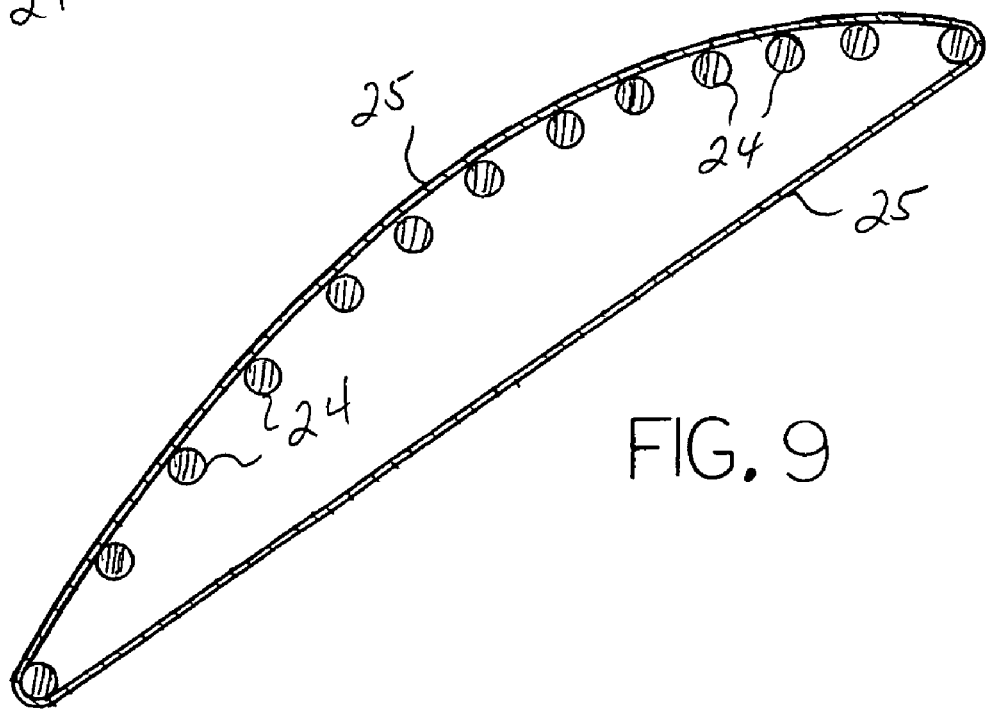

WIND TURBINE

BACKGROUND OF THE INVENTION

The invention relates generally to the field of fluid driven turbines, such as wind turbines or water turbines, wherein electrical power is generated from airflow or water flow across rotor blades. More particularly, the invention relates to such turbines wherein the blades extend from a central rotating hub or shaft member to an annular rotating ring or rim member.

Wind turbines, also known as windmills, wind generators, wind machines or the like, are well known devices for producing energy, typically electrical energy, by harnessing the power of wind. Wind turbines used to generate large amounts of energy are very large structures, standing hundreds of feet tall and having rotor blades extending hundreds of feet, the rotor blades being mounted to a central hub or shaft. Large elongated blades are required since the area of blade sweep is proportional to the power that can be produced by a given wind turbine. This size creates a problem, in that each blade must act as a cantilever that can support the elongated blade and the blades must be increasingly massive toward the central hub in order to preclude the blade from breaking during use. Even with the use of high tech composites, carbon fibers and the like, a practical limit has been reached. For example, most large wind turbines have three blades, as this has been found to be the most efficient design. The desire to increase blade length in order to capture more wind is offset by the accompanying reduction in shaft revolutions per minute (rpm). Reduced rpm's require larger reduction gearboxes, which is undesirable. Decreasing blade pitch in order to increase the rpm's reduces torque, which is undesirable. Thus, known wind turbine designs always have to make sacrifices in order to balance these competing factors.

An alternative type of wind turbine incorporates an outer, annular ring or rim that is joined to the blades, such that the blade tips are no longer self-supporting and thereby allowing the blades to be longer. The blades extend from the central rotating hub or shaft to the annular rim and are therefore supported at both ends. In this embodiment, it is also known to utilize the rotational energy from the rotating annular rim rather than the central hub, since the annular rim travels at much faster speed. Rollers, wheels, gears, magnets or the like are used to transfer the rotational energy from the rim to one or more generator mechanisms or the like. Examples of such turbines are shown in U.S. Pat. No. 4,319,865 to Richard, U.S. Pat. No. 4,330,714 to Smith, U.S. Pat. No. 4,350,895 to Cook, U.S. Pat. No. 4,545,729 to Storm, U.S. Pat. No. 4,729,716 to Schmidt, and U.S. Pat. No. 6,664,655 to Vann. Such wind turbines are often of smaller size and utilize sails rather than blades in order to increase the number of wind catching elements, since the weight of the annular rim adds structural problems to the design.

It is an object of this invention to provide a highly efficient wind turbine, or water turbine, that allows desirable structural characteristics to be maximized, such as increased blade length, increased blade number, reduced blade weight, lowered cost of materials, increased rpm, increased torque, reduced noise and variable control of blade pitch, among others. It is a further object to provide such a turbine wherein the weight of the blades are reduced by structuring each blade as a relatively lightweight skin or sheet material disposed upon a plurality of cable members extending from a central rotating hub or shaft to an outer annular rim, wherein the cable members do the work of supporting the blades' skin and the outer annular rim. It is a further to provide such a turbine wherein, optionally, the pitch of the blades can be adjusted according to wind flow conditions.

SUMMARY OF THE INVENTION

The invention is in general a fluid powered turbine, such as a wind turbine or a water turbine, where airflow or water flow rotates a rotor element about a central shaft or hub member, whereby electrical power or the like is generated by the rotational energy, and wherein the rotor element comprises a plurality of blade members extending from the rotating central hub member to a rotating annular rim member. The blade members each comprise a plurality of cable or similar stay members extending from the hub member to the rim member and a relatively lightweight sheet member or skin disposed upon the cable members, whereby the sheet member as supported by the cable members defines a relatively large deflection surface area, such that when the wind or flowing water strikes the sheet members, the blades, rim and hub members rotate. The sheet members do the work of deflection of the fluid and the cable members in tension do the work of supporting the sheet members and the rim members.

The rotational energy created by the rotor element may be transferred from the central hub member, but is preferably transferred from the annular rim member, since the rim member rotates at greater speed than the hub member. The transfer of rotational energy from the rim member into electrical generator means may be accomplished in various known ways, such as with rollers, wheels, gears, magnets or the like.

The cable members may be mounted to the hub member and the rim member in various configurations and numbers, such that the cables may be attached in a linear, curved or three-dimensional pattern on the hub member and on the rim member, such that the surface configuration and the pitch of the blade member can be chosen so as to maximize efficiency. In an alternative embodiment, the points of attachment for the cable members may be movable such that alternate configurations and pitches can be chosen, either individually or as a unit, in response to changing wind conditions.

The invention is a fluid turbine powered by wind or water comprising a rotor assembly comprising a rotating central hub member and a rotating annular rim member, said rim member joined to said hub by a plurality of blade members; said blade members each comprising greater than two cable members and a skin member disposed thereon and encasing said cable members, wherein said cable members are attached to said rim member and said hub member, and wherein said skin member and said cable members in combination define a predetermined, volume-occupying, three-dimensional configuration for said blade member, such that a moving fluid force deflects off said skin members causing rotation of said rotor assembly.

The invention is a fluid turbine powered by wind or water for generating electrical power comprising a rotor assembly mounted upon a tower member, said rotor assembly comprising a rotating central hub member and a peripheral rim member, said rim member joined to said hub member by a plurality of tensioned cable members, wherein said cable members are grouped to define a plurality of support assemblies, each support assembly supporting a skin member disposed thereon and encasing said cable members to define an individual blade member, wherein said blade members cause rotation of said rotor assembly to create rotational energy in response to fluid movement against said skin members; and generator means in communication with said rotor assembly, whereby rotation of said rotor assembly results in production of electrical power by said generator means.

BRIEF DESCRIPTION OF THE DRAWINGS

FIG. 8 is a cross-sectional view of the fixed shape of the blade of FIG. 3.

FIG. 9 is a cross-sectional view of the fixed shape of the blade of FIG. 4.

DETAILED DESCRIPTION OF THE INVENTION

With reference to the drawings, the invention will now be described in detail with regard for the best mode and the preferred embodiment. In a broad sense, the invention is a fluid powered turbine, such as a wind turbine or a water turbine, where airflow or water flow rotates a rotor element about a central shaft or hub member, whereby electrical power or the like is generated by the rotational energy, and wherein the rotor element comprises a plurality of blade members extending from the rotating central hub member to a rotating annular rim member. For simplicity herein, the invention shall be described using wind as the fluid medium, but it is to be understood that the invention is operational as well with a flowing liquid, such as water.

Figure 1:
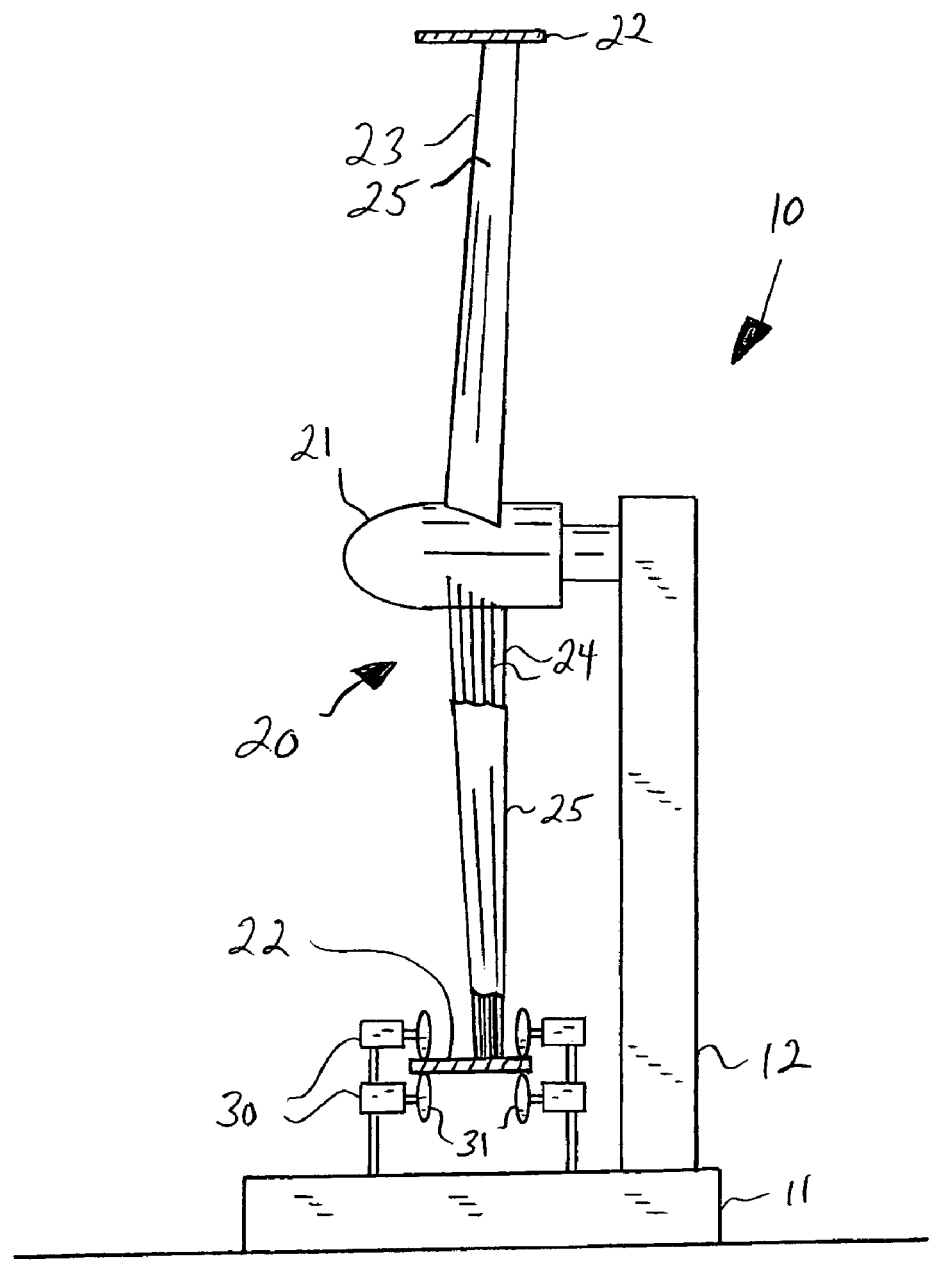
FIG. 1 is a side view of the invention, with one of the blades shown partially exposed to reveal the cable members extending from the hub to the rim.
Figure 2:
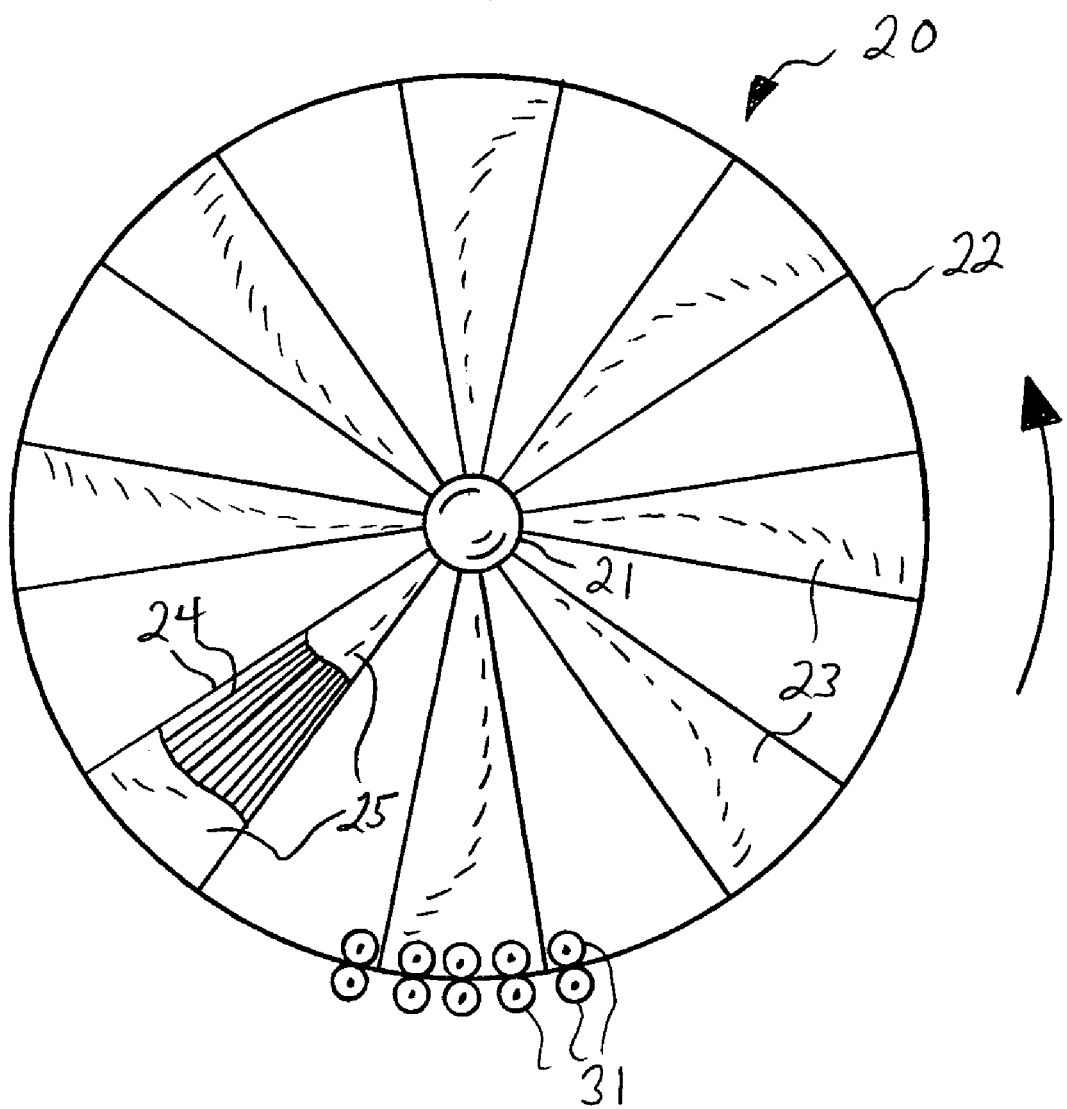
FIG. 2 is a partial front view of the rotor member, also with one of the blades shown partially exposed.

As shown in FIGS. 1 and 2, the invention is a turbine 10 comprising a rotor assembly 20 mounted onto a fixed support means, shown as comprising a base member 11 and a tower member 12, whereby the rotor assembly 20 is positioned to have a generally horizontal axis of rotation in order to capture wind passing across the ground surface. The turbine 10 may be of any size, and the structure as described herein is suitable for very large turbines, where the diameter of the rotor assembly 20 may be hundreds of feet.

The rotor assembly 20 comprises a central rotating hub or shaft member 21 mounted to the tower member 12 such that the rotor assembly 20 can rotate relative to the fixed support means. The rotor assembly 20 further comprises an outer or peripheral annular ring or rim member 22, with the rim member 22 being joined to the central hub member 21 by a plurality of blade members 23, or more specifically internal cable members 24 comprising the blade members 23, the blade members 23 being the means to capture the energy of the wind and translate that energy into rotational movement.

The blade members 23 each comprise groupings of greater than two tensioned cable or similar stay members 24 extending from the hub member 21 to the rim member 22 and a relatively lightweight sheet or skin member 25 disposed upon and enclosing or encasing the cable members 24, whereby the skin member 25 as supported by the cable members 24 defines the predetermined complex curve of the three-dimensional blade member 23 occupying a volume in space and having a relatively large deflection surface area, such that when the wind or flowing water strikes the skin members 25, the blade members 23, rim member 22 and hub member 21 rotate. The configuration of the blade member 23 is fixed and controlled, and is not free to billow or relax in the manner of a sail. The cable members 23 may be composed of various materials having suitable strength and non-elastic properties, such as metal, synthetics, Kevlar, etc. The skin member 25 may be composed of various lightweight materials, such as for example fabric, synthetic sheets, epoxy composites, etc., since the skin member 25 is not required to provide any structural support to the rotor assembly 20 and acts only as a deflection surface against the wind.

Figure 3:
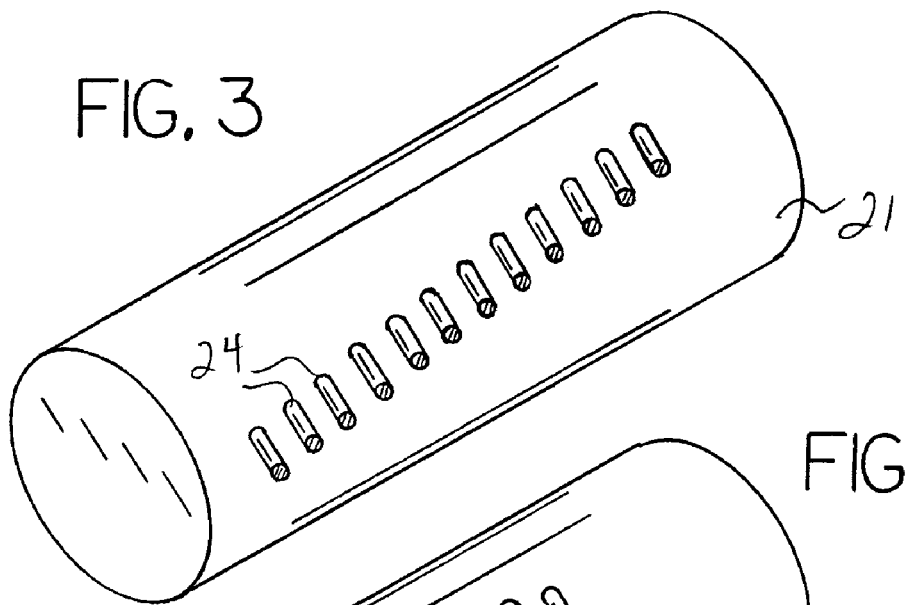
FIG. 3 shows cable members attached to the hub in a linear configuration.
Figure 4:
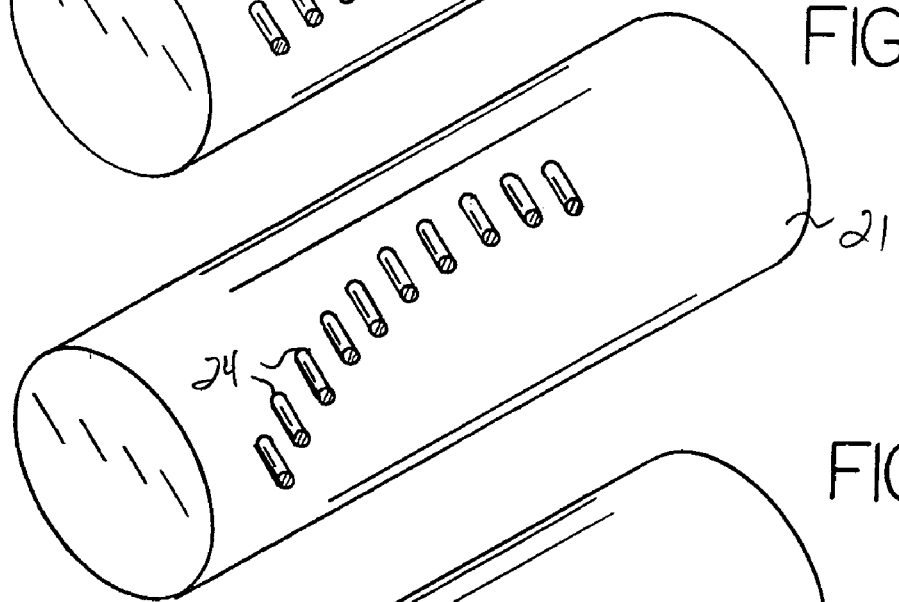
FIG. 4 shows cable members attached to the hub in a curved configuration.
Figure 5:
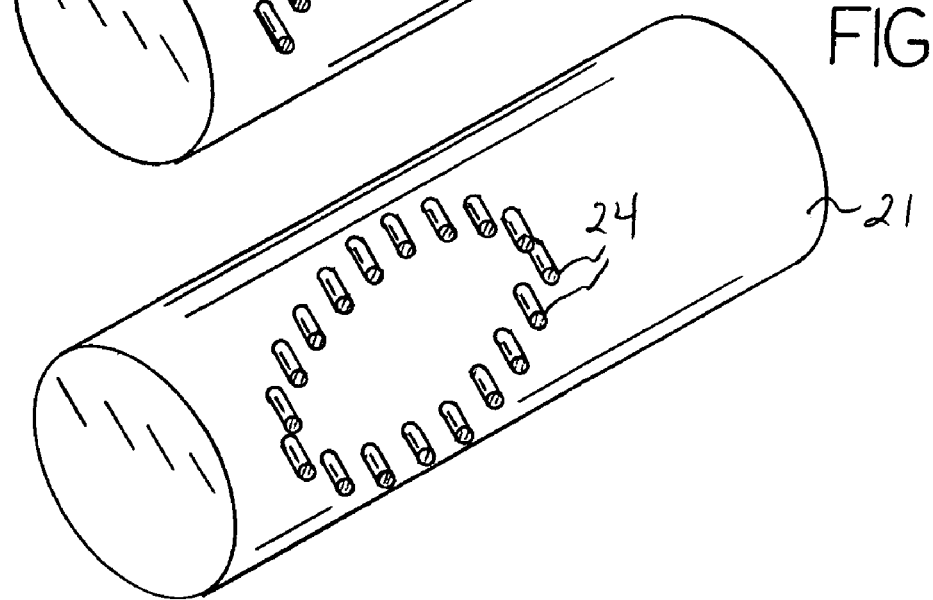
FIG. 5 shows cable members attached to the hub in a three-dimensional configuration.
Figure 10:
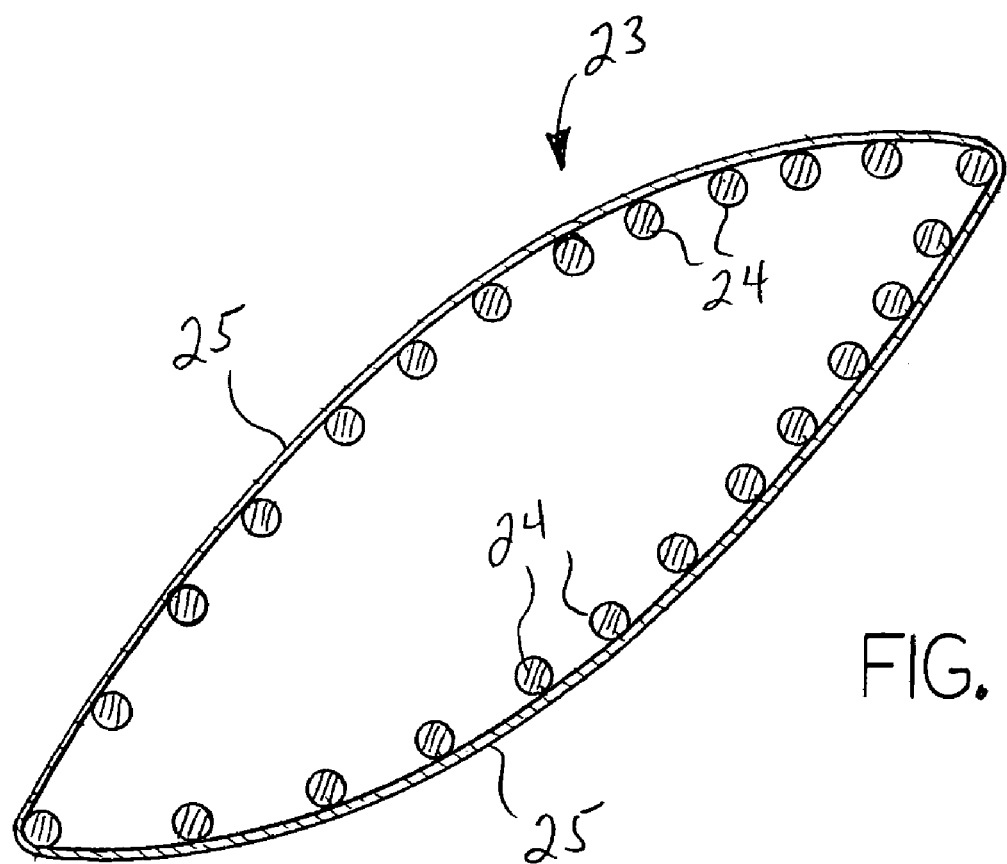
FIG. 10 is a cross-sectional view of the fixed shape of the blade of FIG. 5.

The cable members 24 extending from the hub member 21 to the rim member 22 may be aligned or oriented in various configurations, the attachment alignment of the cable members 24 determining the overall shape of the blade members 23. The cable members 24 may be aligned on the hub member 21 in a linear configuration, as shown in FIGS. 3 and 8, in a curved configuration, as shown in FIGS. 4 and 9, or in a three-dimensional configuration, as shown in FIGS. 5 and 10. In similar manner, the cable members 24 are attached to the interior of the rim member 22. The attachment alignment for the cable members 24 at the hub member 21 and the rim member 22 may be the same or different with regard to pitch, separation distance, configuration, etc. In this manner an infinite number of cross-sectional complex curve configurations for the blade member 23 can be obtained by varying the attachment configuration of the cable members 24, such that an optimal shape for efficiency of the blade member 23 can be achieved relative to the size of the rotor assembly 20, the expected wind conditions, etc.

Figure 6:
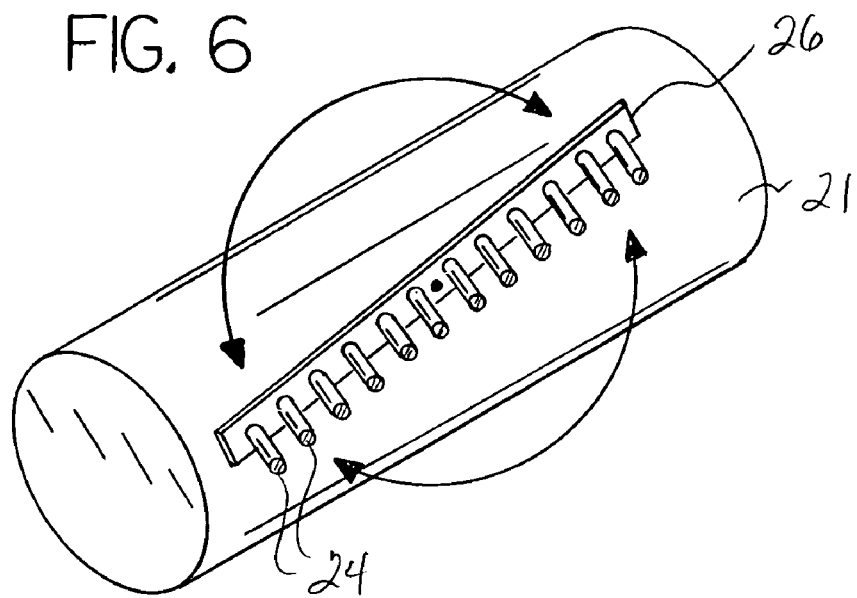
FIG. 6 shows cable members attached to an adjustable cable mounting means that is connected to the hub in a manner that allows the position of the cable members, and therefore the pitch of the blade members, to be altered relative to wind conditions.
Figure 7:
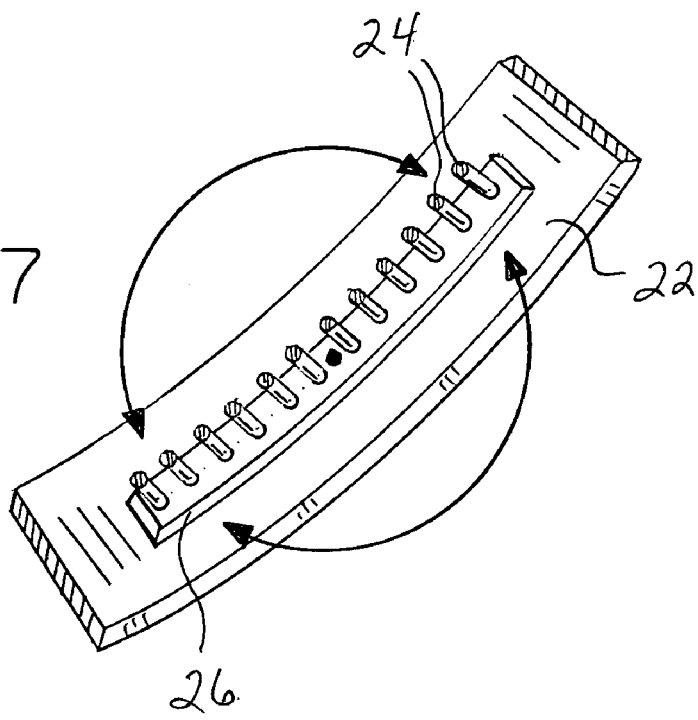
FIG. 7 shows cable members attached to an adjustable cable mounting means that is connected to the annular rim in a manner that allows the position of the cable members, and therefore the pitch of the blade members, to be altered relative to wind conditions.

In an alternative embodiment, the cable members 23 may be mounted to an adjustable cable mounting means 26 that is mounted in movable manner to the hub member 21, as shown in FIG. 6, and/or to the rim member 22, as shown in FIG. 7. The adjustable cable mounting means 26 may be a relatively simple pivoting member as shown, or may involve more complicated mechanisms for moving the cable members 24 either individually or as a unit. By utilizing an adjustable cable mounting means 26, the pitch and the shape of the blade members 23 may be adjusted for optimum efficiency dependent on wind conditions.

In one embodiment, the rotational energy of the rotor assembly 20 may be transferred to generator means 30 via the rotating central hub member 21. Such systems are well known. It is preferred however that the rotational energy of the rotor assembly be transferred to generator means 30 via wheel members 31 that are disposed in contact with the rotating annular rim member 22, as shown in FIGS. 1 and 2. The wheel members 31 may comprise wheels, rollers gears, etc. In an alternative embodiment, the rotational energy of the rotor assembly is transferred through a combination of magnets and coils. It is preferred to transfer the energy from the rim member 22 since the travel speed of the rim member 22 is much greater than the travel speed of the central hub member 21, since a point on the rim member 22 travels a much greater distance per revolution than a point of the hub member 21. This, along with the inherent lightness of the blade member 23, enables a larger number of blade members 23 to be utilized, thereby increasing the amount of air captured. In addition, the pitch of the blade members 23 can be increased (made steeper) or decreased (made flatter) in order to obtain desired blade speed.

It is understood that equivalents and substitutions for certain elements set forth above may be obvious to those skilled in the art, and therefore the true scope and definition of the invention is to be as set forth in the following claims.

I claim:

1. A fluid turbine powered by wind or water comprising:
    a rotor assembly comprising a rotating central hub member and a rotating annular rim member, said rim member joined to said hub and supported by a plurality of blade members;
    said blade members each comprising greater than two cable members and a sheet member disposed thereon and encasing said cable members, wherein said cable members are attached to said rim member and said hub member, and wherein said sheet member is supported by said cable members to define a predetermined, volume-occupying, three-dimensional, hollow configuration for said blade member, such that a moving fluid force deflects off said sheet members causing rotation of said rotor assembly.

2. The turbine of claim 1, further comprising generator means, and wherein rotational force is transferred from said hub member to said generator means.

3. The turbine of claim 1, further comprising generator means, and wherein rotational force is transferred from said rim member to said generator means.

4. The turbine of claim 3, further comprising wheel members in contact with said rim member, and wherein rotational force is transferred from said rim member through said wheel members to said generator means.

5. The turbine of claim 1, wherein said cable members are aligned in a linear configuration on said hub member.

6. The turbine of claim 1, wherein said cable members are aligned in a linear configuration on said rim member.

7. The turbine of claim 1, wherein said cable members are aligned in a curved configuration on said hub member.

8. The turbine of claim 1, wherein said cable members are aligned in a curved configuration on said rim member.

9. The turbine of claim 1, Wherein said cable members are aligned in a three-dimensional configuration on said hub member.

10. The turbine of claim 1, wherein said cable members are aligned in a three-dimensional configuration on said rim member.

11. The turbine of claim 1, further comprising adjustable cable mounting means for attaching said cable members to said hub member such that the position of said cable members relative to said hub member and the pitch of said blade members is adjustable.

12. The turbine of claim 1, further comprising adjustable cable mounting means for attaching said cable members to said rim member such that the position of said cable members relative to said rim member and the pitch of said blade members is adjustable.

13. A fluid turbine powered by wind or water for generating electrical power comprising:
    a rotor assembly mounted upon a tower member, said rotor assembly comprising a rotating central hub member and a peripheral rim member, said rim member joined to said hub member and supported by a plurality of tensioned cable members, wherein said cable members are grouped to define a plurality of support assemblies, each support assembly supporting a sheet member disposed thereon and encasing said cable members to define an individual volume-occupying, three-dimensional, hollow blade member, wherein said blade members cause rotation of said rotor assembly to create rotational energy in response to fluid movement against said sheet members; and
    generator means in communication with said rotor assembly, whereby rotation of said rotor assembly results in production of electrical power by said generator means.

14. The turbine of claim 13, wherein rotational energy of said rotor assembly is transferred from said rim member to said generator means.

15. The turbine of claim 14, further comprising wheel members in contact with said rim member, whereby rotation of said rim member results in rotation of said wheel members, and said rotational energy of said rotor assembly is transferred to said generator means through said wheel members.

16. The turbine of claim 13, wherein said cable members are attached to at least one of said hub member and said rim member in a linear configuration.

17. The turbine of claim 13, wherein said cable members are attached to at least one of said hub member and said rim member in a curved configuration.

18. The turbine of claim 13, wherein said cable members are attached to at least one of said hub member and said rim member in a three-dimensional configuration.

19. The turbine of claim 13, further comprising adjustable cable mounting means for attaching said cable members to said hub member such that the position of said cable members relative to said hub member and the pitch of said blade members is adjustable.

20. The turbine of claim 13, further comprising adjustable cable mounting means for attaching said cable members to said rim member such that the position of said cable members relative to said rim member and the pitch of said blade members is adjustable.

* * * * *